United States Patent
Agarwal et al.

(10) Patent No.: US 10,183,754 B1
(45) Date of Patent: Jan. 22, 2019

(54) THREE DIMENSIONAL GRAPHENE FOAM REINFORCED COMPOSITE COATING AND DEICING SYSTEMS THEREFROM

(71) Applicants: Arvind Agarwal, Miami, FL (US);
Benjamin Boesl, Plantation, FL (US);
Jenniffer Bustillos, Miami, FL (US);
Cheng Zhang, Hollywood, FL (US)

(72) Inventors: Arvind Agarwal, Miami, FL (US);
Benjamin Boesl, Plantation, FL (US);
Jenniffer Bustillos, Miami, FL (US);
Cheng Zhang, Hollywood, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 15/849,020

(22) Filed: Dec. 20, 2017

(51) Int. Cl.
| | |
|---|---|
| *B64D 15/20* | (2006.01) |
| *B64D 15/14* | (2006.01) |
| *F01D 25/02* | (2006.01) |
| *C08J 9/35* | (2006.01) |
| *C01B 32/182* | (2017.01) |
| *F02C 7/047* | (2006.01) |
| *B64D 33/02* | (2006.01) |

(52) U.S. Cl.
CPC .............. *B64D 15/20* (2013.01); *B64D 15/14* (2013.01); *C01B 32/182* (2017.08); *C08J 9/35* (2013.01); *F01D 25/02* (2013.01); *F02C 7/047* (2013.01); *B64D 2033/0233* (2013.01)

(58) Field of Classification Search
CPC ........ B64D 15/20; B64D 15/12; B64D 15/14; B64D 2033/0233; C01B 32/18; C08J 9/35; F01D 25/02; F02C 7/047
See application file for complete search history.

(56) References Cited

U.S. PATENT DOCUMENTS

| | | | |
|---|---|---|---|
| 2008/0166563 A1* | 7/2008 | Brittingham | C08J 3/18 428/411.1 |
| 2010/0140792 A1* | 6/2010 | Haddon | B82Y 30/00 257/713 |
| 2011/0014356 A1* | 1/2011 | Fornes | C09D 7/62 427/58 |
| 2012/0028055 A1* | 2/2012 | Schmidt | B32B 27/40 428/450 |
| 2012/0208008 A1* | 8/2012 | Tour | B82Y 30/00 428/336 |

(Continued)

OTHER PUBLICATIONS

Chen, Z. et al., "Lightweight and Flexible Graphene Foam Composites for High-Performance Electromagnetic Interference Shielding," *Adv. Mater.*, 2013, pp. 1296-1300, vol. 25.

(Continued)

*Primary Examiner* — Medhat Badawi
(74) *Attorney, Agent, or Firm* — Saliwanchik, Lloyd & Eisenschenk

(57) ABSTRACT

An efficient deicing system is a silicone-graphene foam composite connected to a source of electrical energy for current promoted heating of the silicone-graphene foam composite. The deicing system can be constructed by infusion and curing a silicone resin infused into the graphene foam attached to electrical contacts. The deicing system can be attached to surfaces of an aircraft for rapid deicing of the aircraft.

16 Claims, 6 Drawing Sheets

(56) References Cited

U.S. PATENT DOCUMENTS

| | | | | |
|---|---|---|---|---|
| 2012/0290052 A1* | 11/2012 | D'Ambrosio | ............. | A61F 7/12 607/113 |
| 2012/0292439 A1* | 11/2012 | Hallander | ............... | B64D 15/12 244/1 A |
| 2013/0028738 A1* | 1/2013 | Nordin | ................... | H05B 3/145 416/39 |
| 2013/0028744 A1* | 1/2013 | Nordin | ................. | B29C 70/081 416/230 |
| 2013/0034447 A1* | 2/2013 | Nordin | ................. | B29C 70/081 416/230 |
| 2013/0043342 A1* | 2/2013 | Nordin | ..................... | B64C 3/20 244/1 A |
| 2013/0228365 A1* | 9/2013 | Uprety | ................... | B32B 17/10 174/257 |
| 2014/0110049 A1* | 4/2014 | Yuen | ........................ | C09K 5/14 156/280 |
| 2014/0116661 A1* | 5/2014 | Xu | ........................ | H01L 23/373 165/133 |
| 2015/0053663 A1* | 2/2015 | Sakota | ...................... | B64C 1/12 219/202 |
| 2015/0057417 A1* | 2/2015 | Tour | ........................ | C07C 29/32 526/89 |
| 2015/0096969 A1* | 4/2015 | Uprety | .................... | B64D 15/12 219/203 |
| 2015/0246730 A1* | 9/2015 | Khozikov | .............. | B64D 15/12 244/134 D |
| 2015/0345391 A1* | 12/2015 | Snyder | ................... | F02C 7/055 60/39.092 |
| 2016/0221680 A1* | 8/2016 | Burton | ................... | B64D 15/12 |
| 2016/0302264 A1* | 10/2016 | Kessler | .................... | H01B 1/04 |
| 2016/0305321 A1* | 10/2016 | Pujar | ......................... | B64B 1/40 |
| 2017/0082572 A1* | 3/2017 | Jiao | ........................ | B64C 1/1484 |
| 2017/0150659 A1* | 5/2017 | Uprety | ..................... | H05K 1/18 |
| 2018/0002024 A1* | 1/2018 | Brelati | ...................... | C09D 5/00 |
| 2018/0014357 A1* | 1/2018 | Christy | .................. | H05B 3/145 |
| 2018/0029699 A1* | 2/2018 | Nissen | ................... | B64C 27/473 |
| 2018/0057176 A1* | 3/2018 | Kinlen | .................... | B64C 27/46 |
| 2018/0061518 A1* | 3/2018 | Kinlen | ..................... | C09D 7/61 |
| 2018/0084611 A1* | 3/2018 | Hu | ......................... | H05B 3/145 |
| 2018/0084612 A1* | 3/2018 | Hu | ......................... | B64D 15/12 |
| 2018/0084613 A1* | 3/2018 | Hu | ............................ | B32B 5/02 |
| 2018/0124874 A1* | 5/2018 | Dardona | .................. | H05B 3/12 |
| 2018/0162077 A1* | 6/2018 | Hu | ....................... | B29C 71/0072 |
| 2018/0168003 A1* | 6/2018 | Mullen | ................... | B64D 15/12 |
| 2018/0186124 A1* | 7/2018 | Zhao | .......................... | C09J 5/02 |
| 2018/0186460 A1* | 7/2018 | Dardona | ................ | B64D 15/12 |
| 2018/0187561 A1* | 7/2018 | Zhao | ...................... | B64C 3/28 |
| 2018/0192476 A1* | 7/2018 | Chaudhry | .............. | B64D 15/12 |
| 2018/0215476 A1* | 8/2018 | Chee | ...................... | B64D 15/12 |
| 2018/0222135 A1* | 8/2018 | Dias Borges Vianna | .................... | B29O 70/885 |

OTHER PUBLICATIONS

Raji, A-R O. et al., "Composites of Graphene Nanoribbon Stacks and Expoxy for Joule Heating and Deicing of Surfaces," *ACS Appl. Mater. Interfaces*, 2016, pp. 3551-3556, vol. 8.

Verdejo, R. et al., "Functionalized graphene sheet filled silicone foam nanocomposites," *J. Mater. Chem.*, 2008, pp. 2221-2226, vol. 18.

Wang, T. et al., "Passive Anti-Icing and Active Deicing Films", *ACS Appl. Mater. Interfaces*, 2016, pp. 14169-14173, vol. 8.

* cited by examiner

US 10,183,754 B1

THREE DIMENSIONAL GRAPHENE FOAM REINFORCED COMPOSITE COATING AND DEICING SYSTEMS THEREFROM

This invention was made with government support under Grant No. W911NF-15-1-0458 awarded by the Army Research Office. The government has certain rights in the invention.

BACKGROUND OF INVENTION

The aerodynamic performance of aircrafts, wind turbines, rotor blades and other structures operating at temperatures below 0° C., are severely compromised by the adhesion of ice to their surfaces. The continuous accumulation of ice in aircraft surfaces is known to result in the disruption of the airflow with an increase in drag forces and high losses of energy due to mass-imbalance in the structures. Current efforts to reduce and mitigate the ice formation in aircraft surfaces include: dispersion of chemicals; mechanical removal; and electrical heating of surfaces. Electrical heating systems have proven suitable as deicing systems due to the facile induction of heat to promote continuous removal of ice. However, the metals and alloys for current-induced heating elements result in high power consumption.

Recent studies have focused on use of 1D and 2D carbon-based conductive nanoparticles to develop efficient deicing systems. Due to their lightweight, superior electrical and thermal performance these conductive particles have benefits over conventional metal-based systems. The effectiveness of such systems depends on the intrinsic electrical and thermal conductivity of the filler, as well as the nature of the conductive component. For instance, Wang et al. *ACS Applied materials and interfaces*, 2016, 8, 14169-73 demonstrated the potential of functionalized graphene nanoribbons (FDO/GNR) as an anti-icing and active deicing film. The resulting FDO/GNR film is capable of preventing the formation of ice in surfaces down to −14° C. Deicing of surfaces is achieved by resistive heating of the film in periods of 90 seconds by implementing power densities of ~0.2 W·cm$^{-2}$. However, removal of water remnants in the surface requires the introduction of a lubricating liquid.

Despite success for the deicing of surfaces, performance relies strongly on the distribution of conductive particles in their matrix/surface. Therefore, high concentrations of conductive fillers are required to form a complete conductive network and these particles are limited by their tendency to form agglomerates rather than homogeneous dispersions. Such behavior is attributed to strong π-π interactions between nanoparticles. There appears to be the possibility of superior behavior with more hydrophobic matrixes.

Composites comprising silicone, a low surface energy, hydrophobic material, and graphene have been prepared, for example, Verdejo et al. *J. Mat. Chem.*, 2008, 18, 2221-6, but the process involves infusion of silicone foam with functionalized graphene sheets from suspension. The graphene sheets were of particle size 74 microns into an open-cell silicone foam to form silicone foams with up to 0.25 wt %) graphene sheet infusion and thermal conductivities as high as 0.0748 W/mK, about a 50-fold increase over that of the silicone foam. These foams were considered useful for catalysts, filtration media, and for undisclosed applications in biomedical science. Higher thermal conductivities would be desirable for use in deicing.

BRIEF SUMMARY

Embodiments of the invention are directed to a deicing system where a silicone-graphene foam composite is connected to a source of electrical energy. The silicone-graphene foam composite has the graphene foam is continuous throughout the silicone-graphene composite and attached to an electrical contact. The deicing system is in the form of a coating for a metal substrate, such as an aircraft. The graphene foam can be less than 2 percent by volume, for example 0.1 percent by volume. The graphene foam is an interconnected graphene three-dimensional architecture with pore sizes of 100 to 300 μm in diameter. The source of electrical energy can provide a current of 0.8 A or less to promote heating. The power density can be 0.30 W·cm$^{-2}$ or less. The silicone of the silicone-graphene foam can be the product of an addition cured polydimethylsiloxane (PDMS) resin.

Another embodiment of the invention is directed to a method of preparing a deicing system, where a graphene foam is attached to electrical contacts, infused with a silicone resin, curing the silicone infused graphene foam to form a silicone-graphene foam composite, applying the silicone-graphene foam composite to a metal substrate; and connecting the electrical contacts to a source of electrical energy. Curing can be carried out by an addition cure and attaching can be adhering with a silver paste.

Another embodiment of the invention is directed to a method of deicing an aircraft by applying an electrical current to a deicing system silicone-graphene foam composite attached to a portion of the external surface of the aircraft and applying an electrical current to the deicing system. The deicing system can be a coating over the external surface of the aircraft.

DETAILED DISCLOSURE

Embodiments of the invention are directed to three-dimensional (3D) graphene foam (GrF) as continuous conductive filler in polymer composite and deicing systems using the 3D GrF. Graphene foam has a three-dimensional interconnected architecture that imparts an intrinsic uniform electrical and thermal transport path. The GrF displays an extremely low density, of about 4 mg·cm$^{-3}$, and graphene's inherent high electrical, of about $10^6$ S·m$^{-1}$, and high thermal conductivity of 2000-4000 W·m$^{-1}$·K$^{-1}$. The large surface area provided by the 3D structure of GrF not only enhances the electrical performance of polymer composites, but also provides excellent mechanical stability. The A porous GrF-PDMS composite, according to an embodiment of the invention, displays an electrical conductivity of about 500 S·cm$^{-1}$ after being subjected to 10,000 bending cycles. GrF composites, according to embodiments of the invention, are effective as electrical and thermal reinforced lightweight composites displaying enhanced mechanical, electrical, and thermal properties for active deicing components of aircraft.

The conductive GrF-polymer composite displays a high efficiency current that induces heat for deicing. According to an embodiment of the invention, a GrF-polymer composite is fabricated by casting and infiltrating a three-dimensional interconnected architecture of GrF with a low viscosity polydimethylsiloxane (PDMS) resin that is converted to a PDMS matrix. PDMS polymers are useful in aircraft applications as coatings to absorb stresses induced by thermal cycling. PDMS elastomers have excellent heat and oxidation resistance and are highly hydrophobic. The high surface area of GrF allows deicing effectively at as little as 0.1 vol. %. The GrF-PDMS composites form deicing systems with superior electrical and thermal stability after 100 continuous electrical and thermal loading and unloading cycles.

Figure 1A:
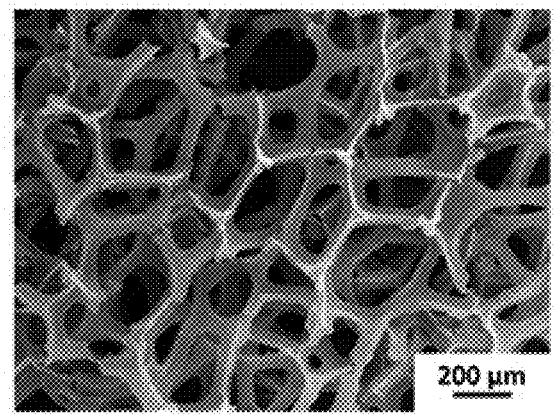
FIG. 1A shows a microscopic image of the interconnected, three-dimensional graphene foam morphology.
Figure 1B:
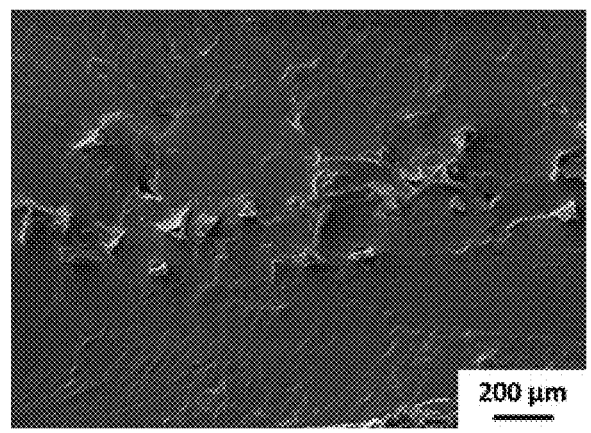
FIG. 1B shows a microscopic image of the GrF-PDMS composite's surface morphology, according to an embodiment of the invention.
Figure 1C:
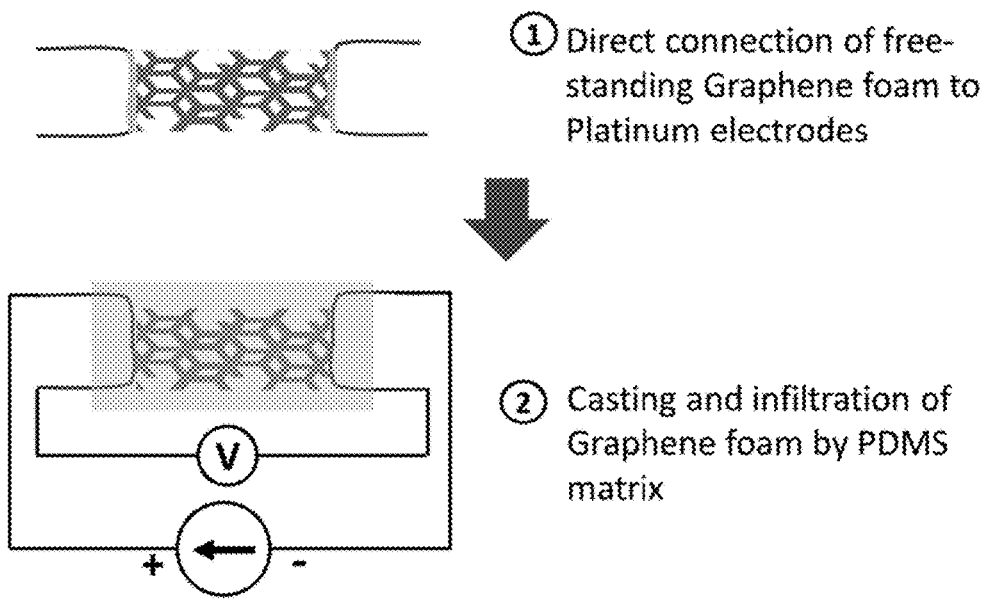
FIG. 1C shows a schematic diagram of preparing a connected GrF-PDMS composite according to an embodiment of the invention.

The GrF is the electrically and thermally conductive component. Free-standing GrF is an interconnected graphene three-dimensional architecture with pore sizes in the range of 100 to 300 μm in diameter, as shown in FIG. 1A. The GrF-PDMS deicing composite is shown in FIG. 1B. The deicing assembly, according to an embodiment of the invention, is formed, as shown in FIG. 1C by connecting GrF to Platinum wires, which are the thermally stable electrodes, followed by infiltration of the GrF by a low viscosity PDMS polymer resin (1000 cps). PDMS polymers display excellent oxidation and thermal resistance.

Figure 2A:
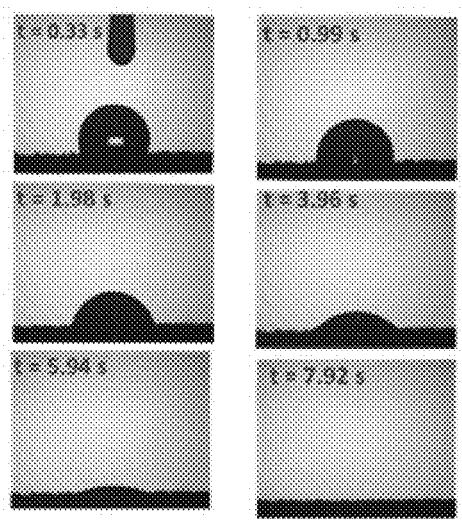
FIG. 2A shows photographic images of wetting and infiltration rate of the low viscosity PDMS into GrF.
Figure 2B:
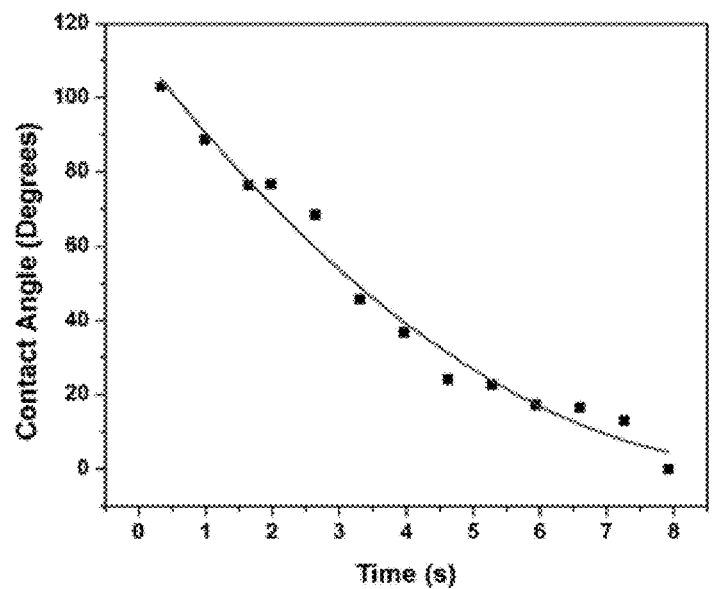
FIG. 2B shows a plot of the contact angle of PDMS on Graphene foam as a function of time.

The 3D interconnected architecture of GrF remains intact after being infiltrated by the PDMS resin and cured to a matrix. A combination of the intrinsic low viscosity and low surface energy of the PDMS polymer allows for nearly complete infiltration of the GrF pores. FIG. 2A shows a drop of PDMS resin on GRF, where complete infusion occurs within 8 seconds. FIG. 2B is a plot of the contact angle of the PDMS drop on the GrF surface over the 8 seconds. Strong interfacial interactions between the PDMS matrix and GrF result in a mechanically robust and flexible structure that can accommodate various surfaces as to form a deicing composite without altering the 3D architecture of GrF. The interconnected conductive network provided by GrF results in GrF-PDMS composites with high electrical conductivities, greater than 400 S·m$^{-1}$ at GrF content of as little as 0.1 vol. %. The superior electrical performance in GrF-PDMS composites is attributed to the fast and uninterrupted electron transport provided by the 3D architecture of GrF. The infiltration of GrF branches retains the benefit for heat dissipation of GrF in the thermally insulating PDMS matrix. The high electrical and thermal conductivity of GrF allows the GrF-PDMS composite to allow high deicing efficiencies.

The continuous network of graphene sheets interconnected by Van der Waals interactions in GrF act as bridges for the ideal transport of phonons and thermal energy over extended areas.

Electronic and lattice contributions combine to yield an intrinsically high thermal conductivity of GrF. The thermal conductivity of GrF is primarily governed by the phonon-phonon transport lattice contributions, where only 0.2-3.6% of the thermal conductivity in GrF is provided by the electrical properties. The interfacial thermal resistance of GrF can be found to be in the range of $10^{-5}$ to $10^{-9}$ K·m$^2$·W$^{-1}$. Therefore, interfacial contact resistance between GrF and PDMS matrix has minimal effect on the ability of the GrF-PDMS composites to conduct thermal energy.

Figure 3:
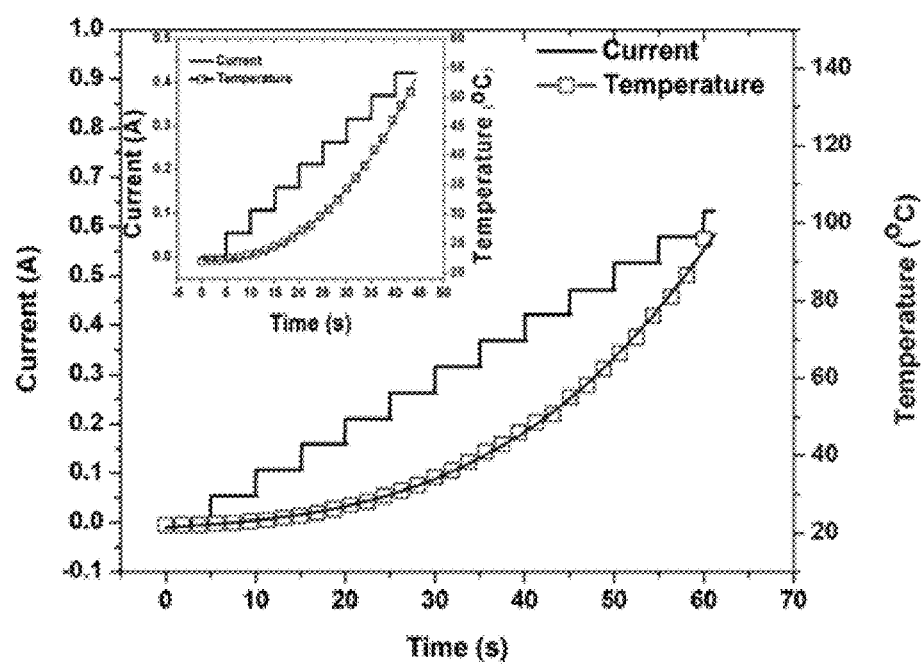
FIG. 3 shows plots of applied current with time and the resulting temperature increase for a free-standing 0.1 vol. % GrF-PDMS composite, according to an embodiment of the invention.

FIG. 3 shows the heating profiles of free-standing 0.1 vol. % GrF-PDMS composite under current-induced heating performed at 25° C. Samples displayed a surface resistance of 2.64 Ω·sq$^{-1}$. An increasing stair direct current sweep from 1 mA to 0.65 A was supplied with a step current of 0.05 A and time steps of 5 s. Thermal response of the deicing composite as a function of current was recorded and identifies the required current for achieving deicing of surfaces. The superior electrical and thermal transport in GrF-PDMS deicing composites resulted in surface temperatures of about 100° C. by supplying 0.6 A. Exposure of aircraft surfaces to T≤0° allows the formation and adherence of frost. Hence, currents of 0.4 A or more allow an increase of surface temperatures with a ΔT≈30° C. in 0.1 vol. % GrF-PDMS deicing composites and results in deicing of surfaces. GrF levels of 0.8 vol % or more can be used.

Direct conversion of electrical to thermal energy within the three-dimensional structure of GrF, promotes heat dissipation by the continuous transport of phonon vibrations resulting in the rapid transfer of heat to the PDMS matrix, with the internal structure of the GrF-PDMS deicing composite experiencing non-uniform temperature gradients. Areas of PDMS surrounding and infiltrating GrF branches experience higher temperatures than those at its surface. A low thermal gradient is found in the PDMS matrix due to the high interfacial temperatures in regions adjacent to graphene. Thermal degradation of the deicing composite occurs after a surface temperature of 150° C. is reached.

Figure 4:
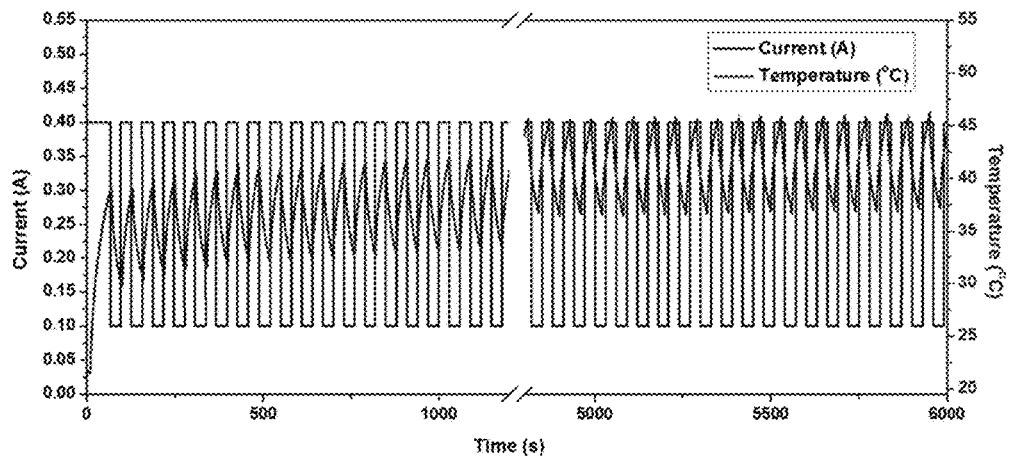
FIG. 4 shows a plot of the changes in surface temperature as a function of current switching with a cycle time delay of 60 seconds for a 0.1 vol. vol. % GrF coating, according to an embodiment of the invention.

The electrical and thermal stability of the GrF-PDMS composite is critical for deicing systems therefrom, which must undergo cyclic electrical and thermal loadings. The GrF-PDMS deicing composites were evaluated with samples of 0.1 vol. % GrF having a sheet resistance of 1.98 Ω·sq$^{-1}$ subjected to 100 cycles of direct current (0.1-0.4 A), with a cycle time delay of 60 s. Changes in surface temperature as a function of current are shown in FIG. 4.

High repeatability in the change of surface temperature is observed for the GrF-PDMS deicing composites due to the superior electrical sensitivity and thermal response of the composite. Changes in resistance of the composite occur only in the initial 16 to 20 cycles, remaining cyclic loading results in highly constant temperature changes (ΔT≈9° C.). This behavior is attributed to the sudden increase and decrease of temperature experienced as a response to the electrical cycling, where changes in resistance are minimized until thermal equilibrium is reached. Additionally, thermal expansion in the sample can result in morphological and interfacial contact variations that affect the electrical performance of the deicing composite. The GrF-PDMS deicing composite has superior reliability and stability up to 100 thermal and electrical cyclic loadings; verifying its suitability as a deicing component for aircraft structures.

Figure 5A:
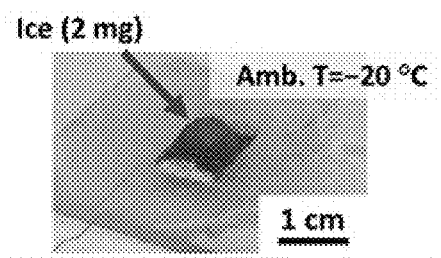
FIG. 5A is a photograph of a deicing system at −20° C. as a coating on a Ti-6Al-4V substrate, according to an embodiment of the invention.
Figure 5B:
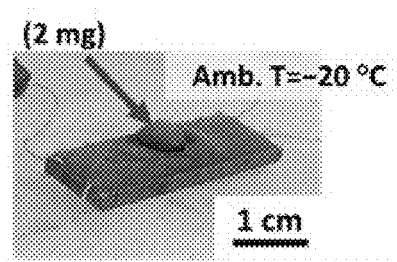
FIG. 5B is a photograph of a free standing GrF-PDMS composite at −20° C.
Figure 6:
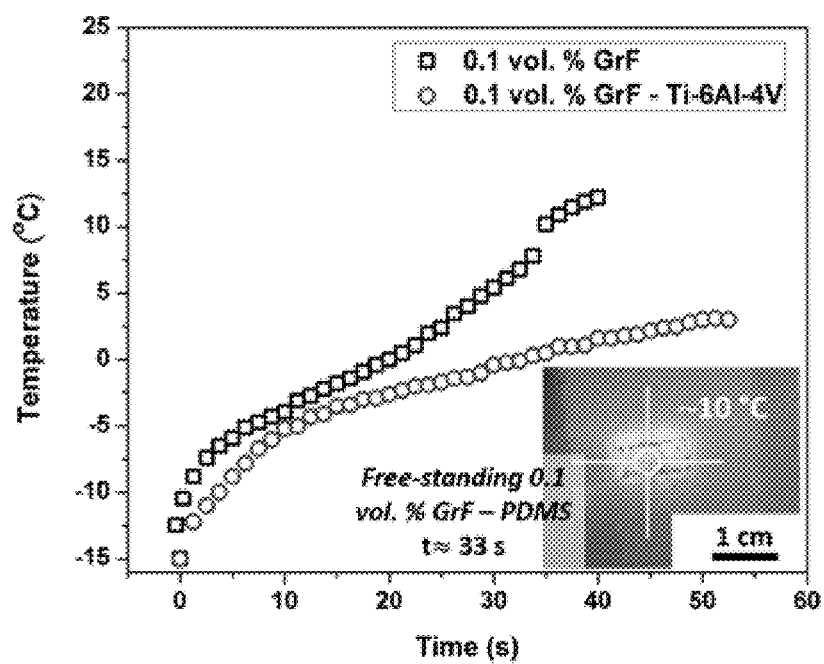
FIG. 6 shows plots of the heating profiles of 0.1 vol. % GrF of a GrF-PDMS composite of FIG. 5B and the deicing system of FIG. 5A with an inserted thermal image of the deicing composite during resistive heating after 35 seconds of heating and a temperature of about 10° C.

FIGS. 5A and 5B show photographs of ice on a free-standing GrF-PDMS composite and a GrF-PDMS composite on a Ti-6Al-4V substrate, respectively, prior to deicing experiments. The GrF dimensions were 1×4×1.2 mm$^3$ at a controlled ambient temperature of ~−20° C. Droplets of deionized water of ~2 mL were placed on the surface of the GrF-PDMS. After freezing, the current-induced heating of the composite was initiated by applying a constant current of 0.4 A to increase the surface temperature to yield a deiced surfaces ($\Delta T \approx 30°$ C.). The time-dependent heating profiles are shown in FIG. 6 for the free-standing and substrate supported GrF-PDMS deicing composites. The free-standing 0.1 vol. % GrF-PDMS deicing composites required only ~0.21 W·cm$^{-2}$ power density to completely deice its surface and achieve the needed $\Delta T \approx 30°$ C. in about 40 s.

The energy required by the GrF-PDMS deicing composite to ensure that the surface reaches the required temperature is evaluated by relating the required power to the deicing composite's resistance and its geometry:

$$\text{Power Density} = \frac{I^2 R}{wl} \quad (1)$$

Where I represents the current implemented during the heating experiment, R is the measured resistance of the composite, and w and l represent the width and length of the composite, respectively.

To demonstrate the capabilities of the GrF-PDMS composite as a deicing component of aircraft structures, GrF-PDMS deicing composites were adhered to Ti-6Al-4V surfaces. Heating profiles demonstrate an evident surface temperature differential of ~10° C. between free-standing GrF-PDMS composites and those adhered to the surface of Ti-6Al-4V substrate. Although heat losses are experienced by conduction through the Ti-6Al-4V substrate, a deicing surface is achieved with power density of 0.30 W·cm$^{-2}$ while inducing heating of the GrF-PDMS composite with 0.4 A current. Power density is less than 0.5 W·cm$^{-2}$. The insignificant temperature difference found in GrF-PDMS on Ti-6Al-4V deicing composites is attributed to the reduced contact resistance between the deicing composite and the substrate. Subjecting the substrate to a uniform roughening treatment such as grit blasting allows the contact thermal resistance (<10$^{-7}$ m$^2$·KW$^{-1}$) to have a negligible effect in the thermal conduction of the composite. The volume concentration of graphene foam in the deicing composite is 25 times lower than that of graphene-based composites deicing systems with similar low power density requirements, as disclosed in Raji et al. *ACS Applied materials and interfaces*, 8, 3551-6 (2016) and Wang et al. *ACS Applied materials and interfaces*, 8, 14169-73 (2016).

The high thermal conductivity of GrF allows deicing of surfaces in free-standing GrF-PDMS deicing composites and those coated on the Ti-6Al-4V substrate to be completed in time periods of less than a minute, which is about a 90% reduction in time for the deicing of surfaces where graphene nanoribbons (GNR) are the basis of deicing systems, as in Raji et al. and Wang et al. Exceptional heat dissipation exhibited by the GrF-PDMS deicing composite is attributed to the three-dimensional interconnected architecture of GrF allowing the uniform dissipation of heat in the transverse and longitudinal direction. Moreover, the hydrophobicity provided by the PDMS matrix promotes the slipping of water remnants in the surface of the heater preventing re-freezing.

To account for the reduced concentrations of conductive GrF filler in GrF-PDMS deicing composites, according to embodiments of the invention, that provides excellent deicing capabilities, a deicing efficiency can be constructed to compare deicing performance of GrF-polymer composites and other graphene-based systems. Deicing efficiency is introduced as a normalized measure of deicing capabilities of deicing composites by relating the rate of deicing experienced by the composite as a function of required power per square centimeter and the volume fraction of graphene-based filler in the deicing composite:

$$\eta(\% \text{ deicing efficiency}) = \frac{\frac{\text{mass}_{ice}}{\text{time}_{deice}}}{\text{Power density} \times Vol.\ Frac_{CF_i}} \quad (2)$$

Figure 7:
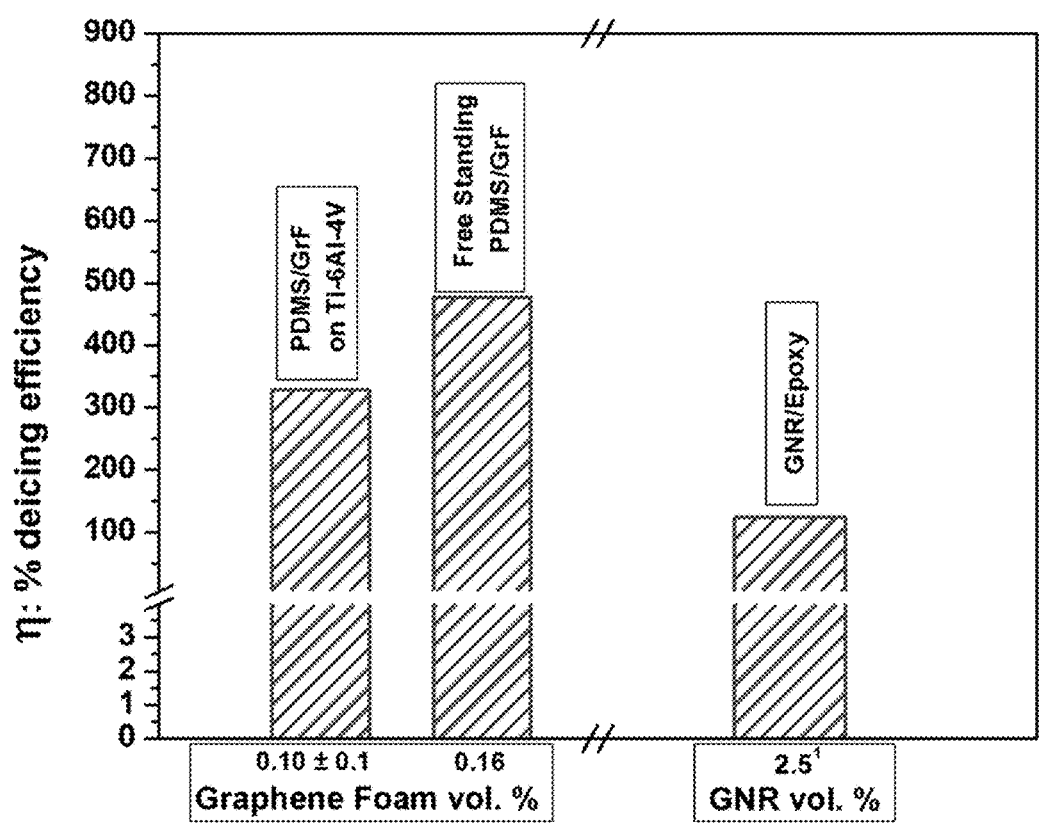
FIG. 7 is a bar chart of the deicing efficiency of a PDMS-GrF composite at 0.1-0.16 vol. % GrF and a deicing system according to an embodiment of the invention as a coating on Ti-6Al-4V metal plate in comparison to a prior art 2.5 vol. % GNR-Epoxy composite.

As shown in FIG. 7, GrF-PDMS deicing composite that are free-standing or on a substrate, having 0.1 vol. % GrF resulted in deicing efficiencies of ~477% and 328% respectively. These values are significantly higher than the 124% achieved with Epoxy/GNR composites with 2.5 vol. % GNR or 3 to 5% with pure and functionalized GNR films. The superior deicing efficiency presented in GrF-PDMS composites is the largest value displayed for light-weight, highly thermal and electrically stable deicing systems. GrF-PDMS deicing composites can be used in place of the current high-power consuming heating elements and high maintenance chemical-based coatings used to tackle surface ice formation in air-craft or other structures.

Methods and Materials

Materials

Free-standing Graphene foam (GrF) from Graphene Supermarket (Calverton, N.Y.) was used as received. A two-component addition cured polydimethylsiloxane (PDMS) resin with a viscosity of 1000 cps (SilGel 612) were obtained from Wacker Chemie AG (Munich, Germany). Ti-6Al-4V substrates were surface treated by grit blasting to a final roughness of ~1.50±0.05 μm, to eliminate oxide layers and promote the adhesion of the GrF-PDMS deicing composite coating.

Synthesis of GrF-PDMS Deicing Composite

Three-dimensional Graphene foam with dimensions of 10 mm in length, 4 mm width and 1.2 mm in thickness was connected to a 0.1 mm diameter platinum wire (Surepure Chemetals, LLC, New Jersey, USA) using Pelco conductive colloidal silver paste (Clovis, Calif.) and cured at 100° C. for 30 min. Colloidal silver paste was added at the interface of the Pt wire and Graphene foam to reduce the contact resistance during current-induced heating. After complete cure of the conductive adhesive, 3D graphene foam was infiltrated by low viscosity PDMS matrix by casting on a glass slide to produce free-standing samples. Similarly, GrF-PDMS composites were cast on Ti-6Al-4V alloy plate having dimensions of 25 mm in length, 10 mm in width, and 1.8 mm thickness to simulate aircraft structures. In order to promote the adherence of the deicing composite as a coating to the substrate, the surface of the Ti-6Al-4V substrate was prepared by grit blasting prior to casting resulting in an average roughness of ~1.50±0.05 μm. The PDMS matrix was prepared by mechanical stirring of crosslinking-containing component (A) and platinum catalyst-containing component (B) in a 2A:1B ratio. The resulting cast Graphene foam-PDMS deicing composite was cured at 100° C. for a period of 30 min.

Electrical Measurements:

Electrical properties of the deicing composite were evaluated by a Keithley 2401 digital source meter (Cleveland, Ohio, USA). Resistances (R) of the GrF-PDMS composite was measured by four-point probe method. Sheet resistance was used to relate the geometry and resistance in the composite:

$$R_s = R \times \frac{w}{l}$$

where w and l refer to the width and length of Graphene foam in the composite, corresponding to the spacing between probes. The respective conductivity a of the composites was computed as:

$$\sigma = \frac{1}{R_s \times t}$$

where t represents the cross-sectional thickness of the Graphene foam in direct contact with the Pt wire.

Current-Induced Heating and Deicing Experiments

Current-induced heating experiments were carried out by supplying DC currents through the deicing composite following the set-up described for electrical measurements. Platinum wire is used to serve as electrical leads due to its thermal stability and oxidation resistance during thermal cycling such as that encountered in a heating element. Changes in temperature on the surface of the GrF-PDMS deicing composite were measured with the aid of an infrared (IR) pyrometer.

Similarly, deicing experiments were carried out inside a Styrofoam box under a controlled ambient temperature of about −20° C. using dry ice. Free-standing GrF-PDMS samples were placed on a glass slide to stabilize flexible composite during deicing experiments. Droplets of deionized water of about 2 mL were placed on the surface of the deicing composite until solid ice formed. The 0.1 vol. % GrF-PDMS/Ti-6Al-4V and the free-standing 0.1 vol. % GrF-PDMS deicing composite, were tilted and supplied with a constant current of 0.4 A during deicing experiments. The corresponding change in surface temperature was followed using an IR pyrometer and a MR thermal imaging camera (Wilsonville, Oreg., USA).

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A deicing system comprising a silicone-graphene foam composite connected to a source of electrical energy, wherein the graphene foam is continuous throughout the silicone-graphene composite and wherein the silicone-graphene foam composite is in the form of a free-standing system or a coating for a metal substrate.

2. The deicing system according to claim 1, wherein the graphene foam comprises less than 2 percent by volume.

3. The deicing system according to claim 1, wherein the graphene foam comprises at least 0.1 percent by volume.

4. The deicing system according to claim 1, wherein the graphene foam is an interconnected graphene three-dimensional architecture with pore sizes of 100 to 300 μm in diameter.

5. The deicing system according to claim 1, wherein the source of electrical energy provides a current of 0.8 A or less.

6. The deicing system according to claim 1, wherein the source of electrical energy provides a current of 0.4 A or less.

7. The deicing system according to claim 1, wherein the power density is 0.30 W·cm$^{-2}$ or less.

8. The deicing system according to claim 1, wherein the silicone of the silicone-graphene composite is the product of an addition cured polydimethylsiloxane resin.

9. The deicing system according to claim 1, wherein the metal substrate is an aircraft component material.

10. A method of preparing a deicing system according to claim 1, comprising:
    providing a graphene foam;
    attaching electrical contacts to the graphene foam;
    providing a silicone resin:
    infusing the silicone resin into and on the graphene foam to form a silicone infused graphene foam;
    curing the silicone infused graphene foam to form a silicone-graphene foam composite;
    applying the silicone-graphene foam composite to a metal substrate; and
    connecting the electrical contacts to a source of electrical energy.

11. The method according to claim 10, wherein curing is an addition curing.

12. The method according to claim 10, wherein attaching is adhering with a silver paste.

13. The method according to claim 10, further comprising surface treating the metal substrate.

14. The method according to claim 13, wherein the surface treating comprises grit blasting.

15. A method of deicing an aircraft, comprising applying an electrical current to an aircraft with a deicing system according to claim 1 attached to a portion of the external surface of the aircraft.

16. The method of claim 15, where in the deicing system is a coating over the external surface of the aircraft.

* * * * *